United States Patent
Miller

Patent Number: 5,689,317
Date of Patent: Nov. 18, 1997

[54] TUNABLE COLOR FILTER

[75] Inventor: Peter Miller, Cambridge, Mass.

[73] Assignee: Cambridge Research Instrumentation, Inc., Cambridge, Mass.

[21] Appl. No.: 408,378

[22] Filed: Mar. 22, 1995

[51] Int. Cl.⁶ .................. G02F 1/1335; G02F 1/1347
[52] U.S. Cl. ............................................ 349/97; 349/80
[58] Field of Search ........................ 359/63, 64, 53, 359/96; 349/97, 80, 112, 117

[56] References Cited

U.S. PATENT DOCUMENTS

| | | | |
|---|---|---|---|
| 2,586,635 | 2/1952 | Fernsler | 348/817 |
| 2,753,763 | 7/1956 | Haines | 359/250 |
| 2,834,254 | 5/1958 | Sage | 359/250 |
| 3,785,721 | 1/1974 | Harsch | 359/76 |
| 3,967,881 | 7/1976 | Moriyama et al. | 359/53 |
| 4,019,808 | 4/1977 | Scheffer | 359/48 |
| 4,097,130 | 6/1978 | Cole | 359/53 |
| 4,232,948 | 11/1980 | Shanks | 359/53 |
| 4,239,349 | 12/1980 | Scheffer | 359/48 |
| 4,241,339 | 12/1980 | Ushiyama | 359/53 |
| 4,394,069 | 7/1983 | Kaye | 359/53 |
| 4,398,805 | 8/1983 | Cole | 359/65 |
| 4,416,514 | 11/1983 | Plummer | 359/53 |
| 4,460,248 | 7/1984 | Shirai | 359/53 |
| 4,582,396 | 4/1986 | Bos et al. | 348/742 |
| 4,758,818 | 7/1988 | Vatne | 345/151 |
| 4,770,500 | 9/1988 | Kalmanash | 359/53 |
| 5,311,339 | 5/1994 | Fertig et al. | 359/53 |
| 5,347,378 | 9/1994 | Handschy et al. | 359/53 |

FOREIGN PATENT DOCUMENTS 52-5550 1/1977 Japan ........................... 359/64

OTHER PUBLICATIONS

Yariv et al., Optical Waves in Liquid Crystals, Chapter 5.

*Primary Examiner*—William L. Sikes
*Assistant Examiner*—Charles Miller
*Attorney, Agent, or Firm*—Cohen, Pontani, Lieberman & Pavane

[57] ABSTRACT

A color filter having an optical switch element located between a neutral linear polarizer and a second color-selective linear polarizer, followed by one or more optical retarders and a second neutral linear polarizer. When a second optical switch element is incorporated, three color states are produced. The filter may also comprise a guest host type cell as the optical switch element. The resulting color filter exhibits high performance both for on-axis and off-axis rays and can be designed to produce a wide range of colors.

54 Claims, 13 Drawing Sheets

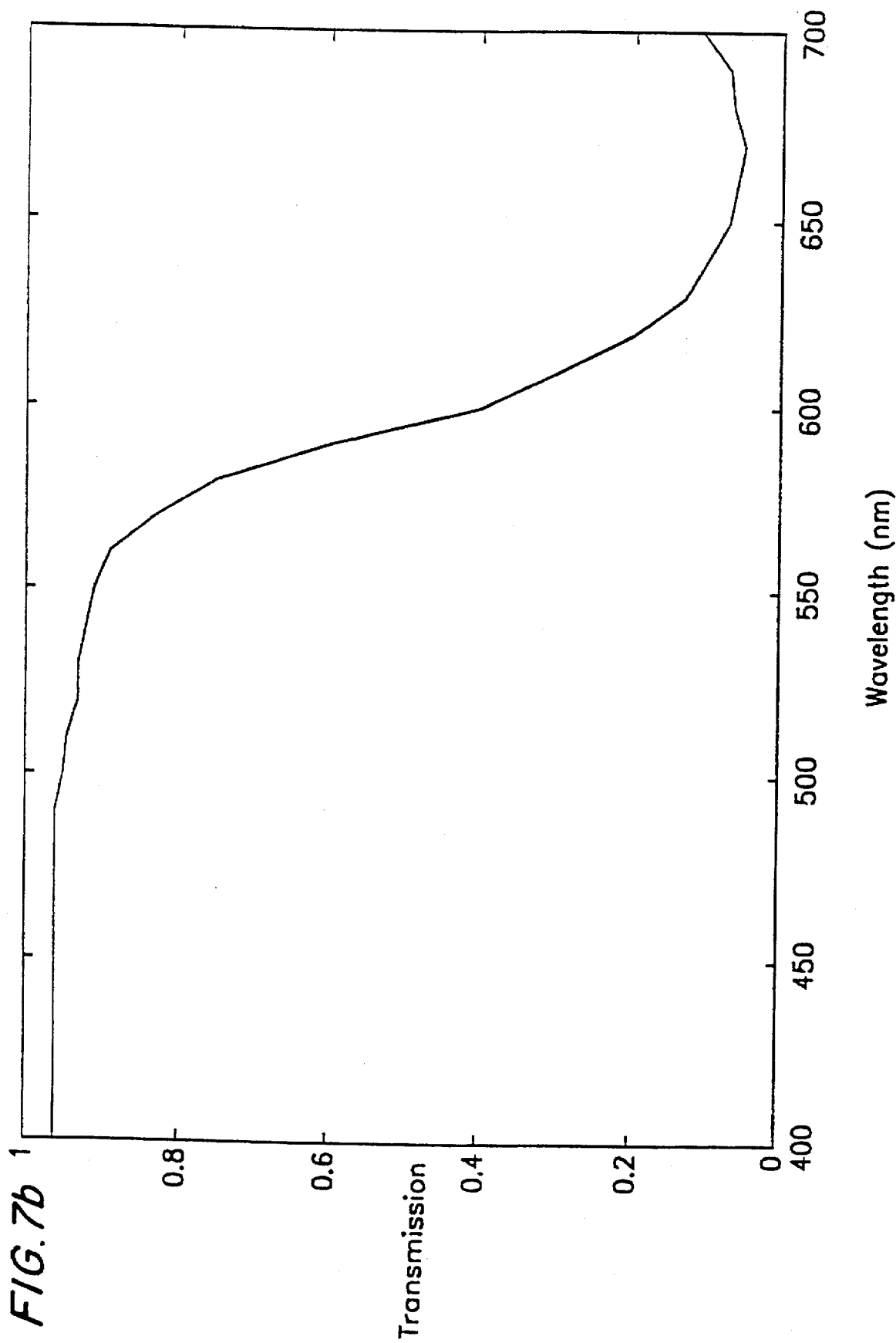

TUNABLE COLOR FILTER

FIELD OF THE INVENTION

The present invention is directed at the field of color filters, particularly those having selectable color states.

In U.S. Pat. No. 4,019,808, Scheffer explains that a color filter may be constructed from a neutral linear polarizer, a twisted-nematic liquid crystal cell, and a color-selective polarizer, placed in series. Scheffer utilizes a type of color-selective polarizer which transmits one color for vertically polarized incident light, and a different color for horizontally-polarized light. For example, such a polarizer can be made by joining a polarizer which absorbs horizontally-polarized green and red light, together with a polarizer which absorbs vertically-polarized blue and green light. The overall filter arrangement is depicted in FIG. 1.

In the above-referenced Scheffer filter, incident light is vertically polarized by the neutral linear polarizer. When no voltage is applied to the twisted-nematic cell, it rotates the plane of polarization by 90°, so light leaving this element is horizontally polarized. At the color-selective polarizer, only blue light is transmitted, and it exits in the horizontal polarization state. Conversely, when the twisted-nematic cell is energized, it produces no optical rotation, and light reaches the color-selective polarizer in the vertical polarization state. Accordingly, only red light is transmitted, and it leaves the filter in the vertical polarization state.

Thus Scheffer's filter effects a color selection based on the spectral properties of dyes used in the color-selective polarizer components. The twisted nematic liquid crystal cell is used to rotate the polarization axis of linearly polarized light, or not, depending on whether the cell is energized. This filter suffers the limitation that the colors which can be produced are limited by the available dye chemicals which can be incorporated into color-selective polarizers. These polarizers need to polarize all colors except the desired hue, and transmit that very efficiently. Thus, the dye must be highly dichroic and spectrally selective. Relatively few types of such color-selective polarizers are commercially available at present, giving little freedom as to the colors which may be produced with such a filter. Also, transmittance of these polarizer materials is relatively low, and accordingly filter efficiency suffers. Another limitation is that the polarization state of light leaving the filter varies during filter operation.

A related system has been described by Bos and Johnson in U.S. Pat. No. 4,582,396. It consists of a neutral polarizer, a variable-retardance liquid crystal cell, and a color-selective polarizer, placed in series. In this filter, the variable-retardance cell is oriented with its crystal axis at 45°, while the neutral polarizer and color-selective polarizer have transmission axes at 0° or 90°. The variable retarder is operated at a retardance of either zero or approximately $\lambda/2$, in which conditions it respectively does nothing to the polarization of light passing through it, or it alters it by 90°. Thus the overall effect is similar to that of the Scheffer system, although the speed of response is improved due to the superior hydrodynamics of the variable retarder cell. It is subject to the same limits as to the colors which may be produced, the overall efficiency, and to the variable polarization state of the exiting light. The fact that the variable retarder is chromatic presents yet an additional drawback. When operated with a nominal retardance of $\lambda/2$, the actual retardance depends slightly on the wavelength being considered. The result is that the switching action is imperfect and there is some mixing of the two desired output colors.

Scheffer teaches a filter system based on linear polarizer in U.S. Pat. No. 4,239,349 (the "'349 patent"). A neutral polarizer, a birefringent retarder, a twisted-nematic liquid crystal cell, and a second neutral linear polarizer are placed in series. The polarizers may be either parallel or crossed, with axes at 0° or 90°, which is also the buffing axis of the entrance face of the twisted nematic liquid crystal cell. The birefringent retarder is oriented with its crystal axis at 45°. The arrangement is pictured in FIG. 2, with the neutral polaizers parallel .

Linearly polarized light is incident on the retarder, which produces color f titration by polarization interference, as in a Lyot filter. Operation of Lyot filters is described in *Optical Waves in Crystals*, by A. Yariv and P . Yeh. Certain colors interfere constructively, and others destructively, according to the thickness and type of birefringent material employed. If the twisted nematic cell is driven, it has no optical effect, and wavelengths which interfere constructively are transmitted. When undriven, it rotates the plane of polarization 90°, so the colors which were extinguished at the second neutral polarizer are now transmitted, and vice versa. In this state, the intensity distribution is exactly complementary to the distribution in the driven state.

This filter has the benefit that the wavelengths of peak transmission can be specified by the filter designer, through suitable choice of the birefringent material and its thickness. However, the periodic nature of the polarization interference which it employs means that a variety of unwanted wavelengths are present with substantial transmission. It would be desirable in most cases to have these secondary peaks reduced or removed.

Scheffer's '349 patent describes how this can be effected, at least in part, by use of two such filters in series. The second filter can be designed to yield low transmission at wavelengths where the first filter has unwanted secondary peaks. This scheme is less than ideal as a means of color shaping, both because of the need for additional components, and because the effectiveness of such a second stage is limited. Specifically, it is not possible to produce effective blocking of all unwanted peaks when the filter is tuned. At the same time, transmission suffers since the peak wavelengths of the two filters are not generally co-incident. As a result, the color saturation which can be achieved by either a single filter or two filters in series, is limited.

Handschy et. al., in U.S Pat. No. 5,347,378, describe how a color filter may be constructed using surface-stabilized ferroelectric liquid crystal (SSFLC) cells as switching elements. The SSFLC cell provides a birefringent layer whose crystal axis may be toggled between two settings by application of an electric field, with a very fast response time (100 µs or less). Two classes of filters are described: one based on color-sensitive dyes and the second based on polarization interference. The first class includes two basic designs. One design uses a linear polarizer in series with guest-host SSFLC cells, containing colored dichroic dyes. The guest dyes are switched in or out of the plane of polarization by the rotation of the host ferroelectric material. One SSFLC element is required per color state, or three SSFLC elements for the RGB system Handschy et. al. describe. A second design type utilizes a linear polarizer with its transmission axis at 0° followed by one or more stages consisting of an SSFLC whose crystal axis is switchable between 0° and 45°, and a piece of color-selective polarizer. The SSFLC acts as a half-wave plate to convert the polarized light from 0° to 90° orientation, or not, depending on its setting.

The guest-host systems suffers from the relatively low order (S≈0.76) of dichroic dye guest-host systems. This means that only a limited on-off contrast is available in each stage, with some loss even when not engaged. Since several guest-host stages are used in series, the overall filter transmission is rather low. The designs using color-selective polarizers share the problem of the Bos and Johnson system of U.S. Pat. No. 4,582,396, in that the chromatic nature of the SSFLC retarder causes the switching action to be imperfect and mixes the color states, reducing the color purity. Also, the output polarization changes as the filter is tuned, unless an extra SSFLC element and linear polarizer are placed in series with the filter to compensate for the change. Like all systems based on color dyes, the color sets are limited by the properties of available dyestuffs.

SSFLC designs based on retardance consist of linear polarizers with its polarization axis at 0°, followed by one or more stages containing an SSFLC element whose crystal axis may be switched between 0° and 45°, and a linear exit polarizer. In some cases a fixed retarder element with its axis at 45° is placed between the SSFLC and the exit polarizer. These components act like stages in a Lyot filter, where the SSFLC is used to change the retardance, and thus to select which wavelengths interfere constructively and which interfere destructively. While this design allows selection of the color set, it is not possible to achieve high extinction of unwanted wavelengths when only one or two stages are used. Handschy et. al. teach that it is necessary to place a fixed filter made of colored glass or plastic in series with the other components to block violet wavelengths which are not well-extinguished by the SSFLC stages.

As the prior art demonstrates, there has heretofore been no method or apparatus described which provides a color filter where the colors being transmitted can be chosen with substantial flexibility to permit realizing a desired set of colors, which has high transmission, and which is capable of achieving a high color purity or saturation. Birefringent filter devices presently in use exhibit unwanted sidelobes or secondary transmission peaks. Filters based on color-selective polarizers can only implement limited color sets, have low efficiency, and change their output polarization state when tuned. The present invention overcomes the above-described limitations of the prior art.

SUMMARY OF THE INVENTION

The present invention is a switchable color filter which achieves color saturation substantially superior to that of birefringent filters previously described, while providing a set of colors which is not set by the properties of color-selective polarizer material. The invention is not intended to be limited to a particular type of optical switch element, although a liquid crystal switch element is generally preferred. As used herein the term optical switch is any element capable of selectively altering the polarization state of light passing through it. Filters in accordance with the invention may, by way of non-limiting example, utilize as optical switch elements twisted-nematic liquid crystal cells (including supertwist cells), variable-retardance liquid crystal cells, SSFLC cells, guest-host liquid crystal cells, electroclinic mode liquid crystal cells, as well as other optical switching structures such as Kerr cells, Pockels cells or other such art-recognized switch elements or cells capable of performing the optical switching functions herein described, and the term optical switch is to be understood as including all such devices or their equivalents. The invention provides a filter whose output polarization is constant for all tuning states, with improved blocking of unwanted wavelengths of light without the use of additional liquid crystal cells or other switch elements.

BRIEF DESCRIPTION OF THE DRAWING FIGURES

In the Drawing Figures:

FIGS. 1 and 2 depict color filters heretofore known in the prior art;

FIG. 3 diagrammatically illustrates an embodiment of the inventive filter using a twisted-nematic element;

FIG. 7b shows the transmission produced by the red-absorptive polarizer utilized in the embodiment of FIG. 6;

DETAILED DESCRIPTION OF THE PREFERRED EMBODIMENTS

The present invention is a color filter incorporating both birefringent polarization interference, and color-selective polarizer elements or a guest-host element. As used herein the term color-selective polarizer is understood to mean, and one skilled in the art will recognize it to mean, an element which provides wavelength selective absorption for light having a selected polarization state, while light of complementary polarization states may undergo wavelength selective absorption or wavelength neutral absorption, depending on design choice.

Figure 1:
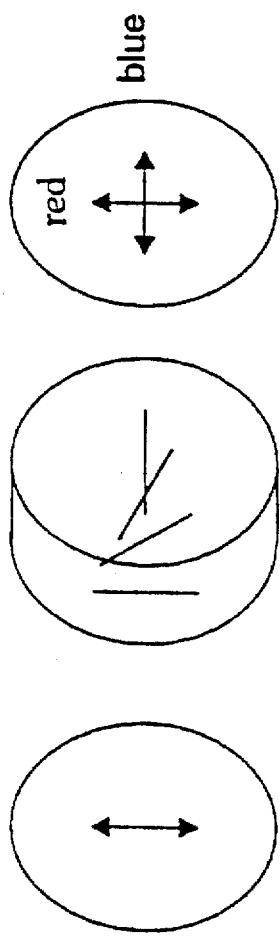
Figure 2:
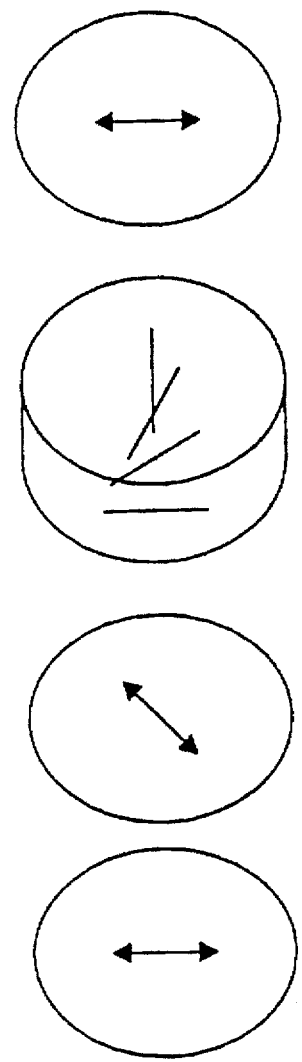
Figure 3:
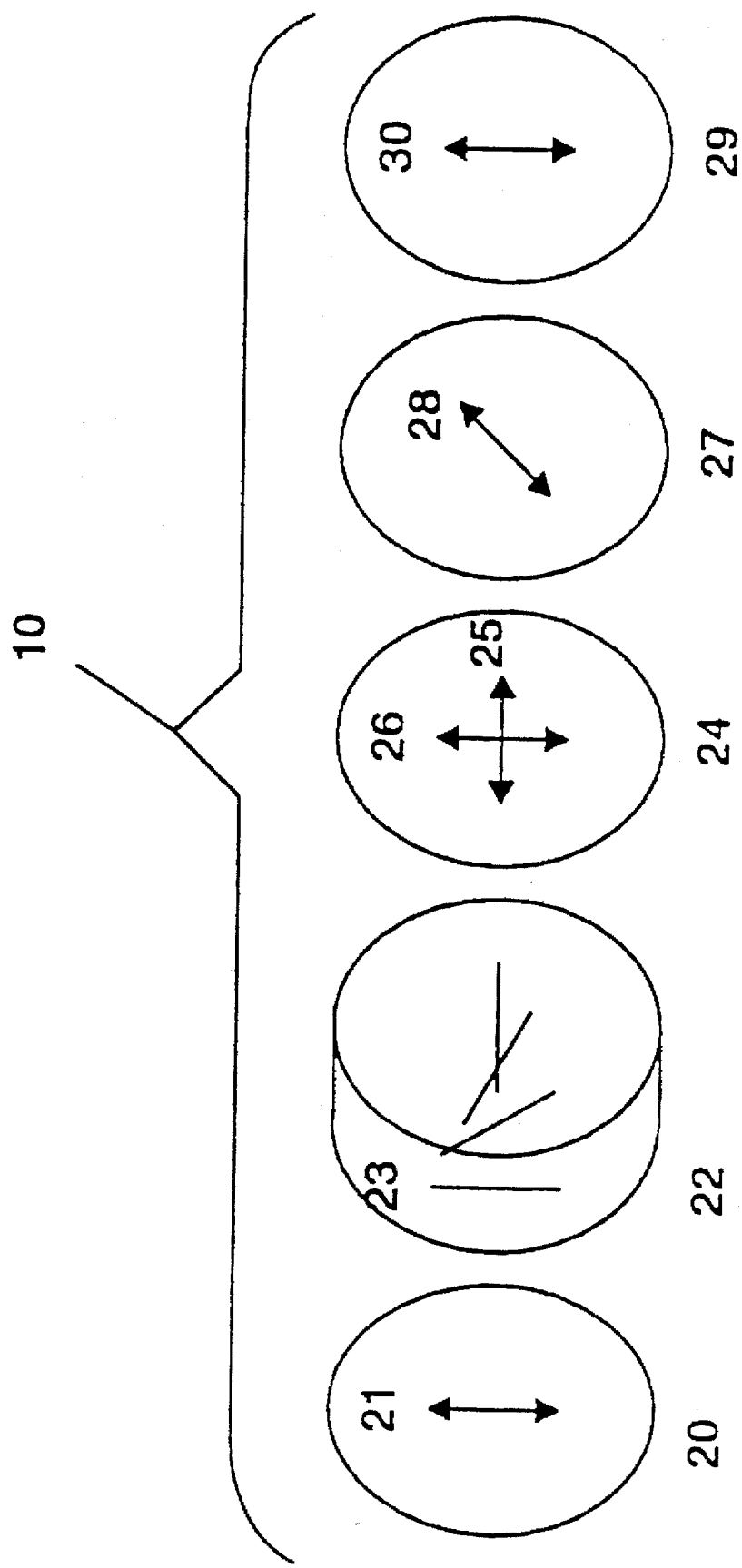

An example of a filter 10 in accordance with the invention is shown in FIG. 3, and consists of a neutral linear polarizer 20 with its polarization axis 21 oriented to transmit only vertically polarized light; a twisted-nematic liquid crystal cell 22 with its entrance crystal axis 23 parallel to the optical polarization axis; a color-selective polarizer 24 which transmits all light polarized along its horizontal axis 25, and absorbs light with λ<450 nm along its vertical axis 26, thus having no polarization effect on red, green, or blue light but horizontally polarizing violet light; an optical retarder 27 with its crystal axis 28 oriented at 45° to the horizontal; and a neutral analyzer polarizer 29 with its transmission axis 30 oriented along the vertical. As used herein the term optical retarder is understood to mean, and one skilled in the art will recognize it to mean, any element which introduces a polarization dependant phase delay on light passing through it. The above-described elements are relatively positioned in optical alignment so that light may pass through all elements in series, although as further described herein, and as will be apparent to one skilled in the art, in certain embodiments the particular order of the elements may be varied as long as they remain in optical alignment.

Operation of the device 10 is understood by considering the propagation of light through the ensemble when the twisted-nematic cell 22 is on and when it is off. When the cell 22 is off, it rotates the polarization of light by its pitch angle of 90°, and vertically-polarized light emerging from polarizer 20 is rotated into the horizontal state. Next it encounters the color-selective polarizer 24, which transmits horizontally-polarized light of all colors and thus has no effect on the beam. Passing through the retarder 27 the light experiences a polarization-dependent phase delay which is analyzed at the exit polarizer 29. This produces a color-dependent transmission T(λ):

$$T(\lambda) = \sin^2(\pi R/\lambda)$$

where R is the retardance of element 27 and λ is the wavelength. It is of course recognized that in practice R is dependent on wavelength λ, a well known effect which is due to optical dispersion in the ordinary and extraordinary indices—$n_o$ and $n_e$ respectively—which shifts the locations of the spectral features slightly. For simplicity, however, the nomenclature R will be used herein.

Figure 4A:
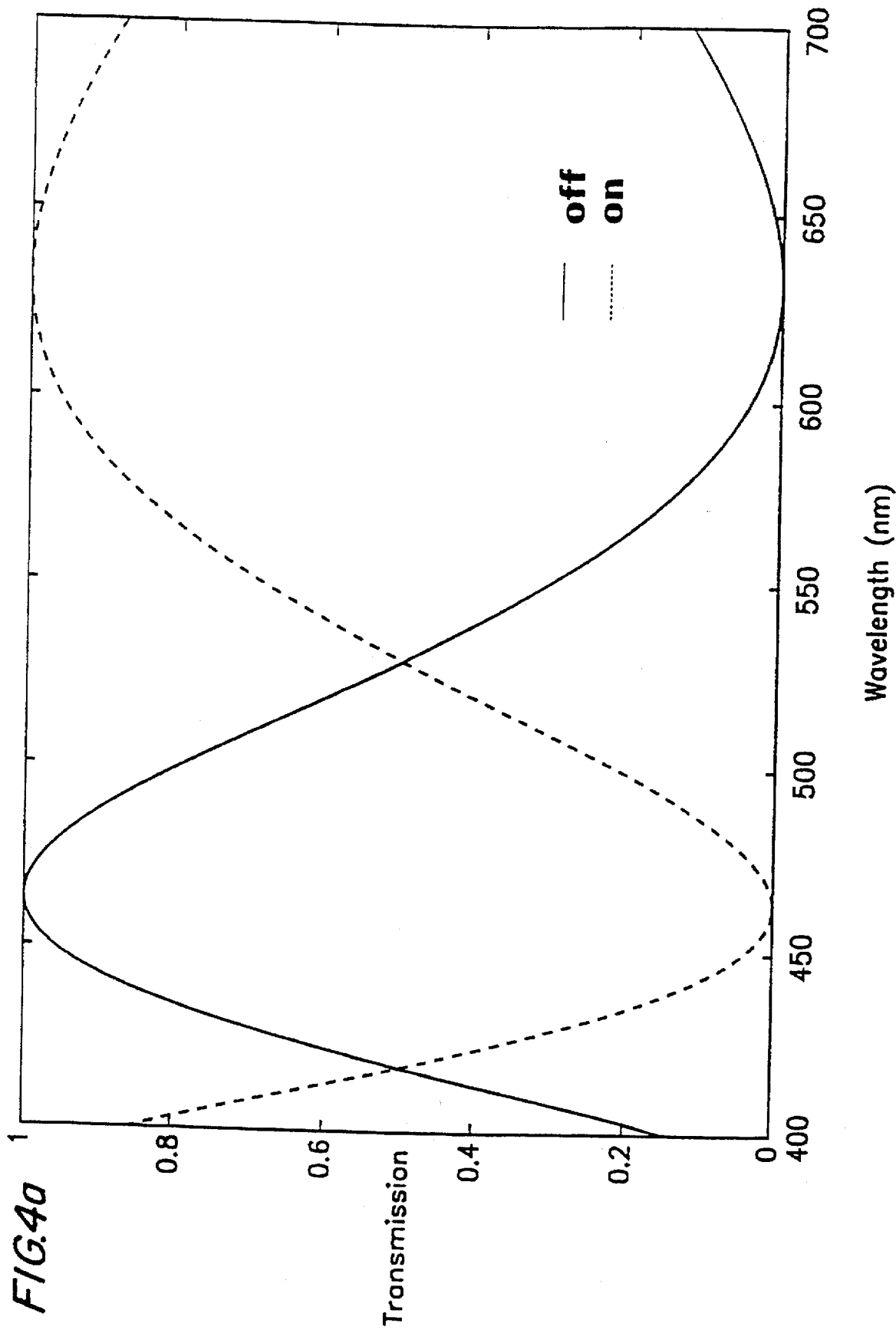
FIG. 4a shows the transmission produced by a birefringent retarder alone.

Returning to the example wherein cell 22 is off, and for a selected nominal retardance of 630 nm, an exemplary transmission curve is shown in FIG. 4a. It has a maximum at 460 nm, dropping to a minimum at 630 nm. The light thus produced has an aqua color. Of course one skilled in the art will recognize that the selected nominal retardance is strictly a matter of design choice depending on the application to which the filter will be applied.

When the cell 22 is on it does not alter the polarization of light for paraxial rays. Incident light is vertically polarized at the entrance polarizer 20, passes unchanged through cell 22 to the color-selective polarizer 24 which absorbs all the violet components but leaves the light vertically polarized. Light passes through the birefringent material of retarder 27 and this time experiences a color-dependent transmission T(λ) which is the complement to that just described, namely:

$$T(\lambda) = \cos^2(\pi R/\lambda)$$

Figure 4B:
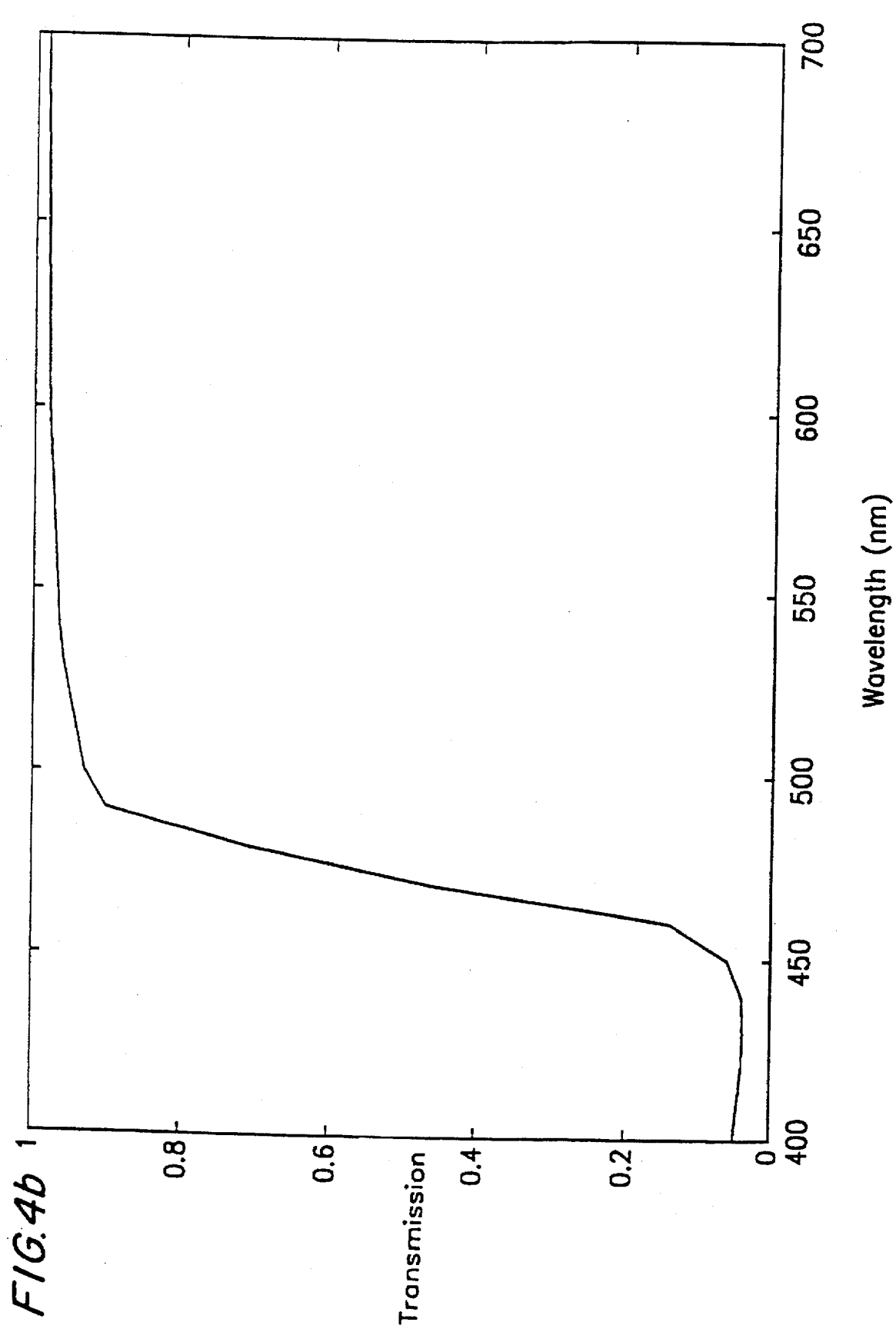
FIG. 4b shows the transmission produced by a violet-absorptive polarizer.

This is readily understood by considering that the polarization of the light incident on retarder 27 is orthogonal or complementary to what it was in the previous case. This function, graphically depicted in FIG. 4a, shows a transmission maximum at 630 nm, with a decrease at shorter wavelengths until the minimum is reached at 460 nm. Below this wavelength, the transmission increases, according to the periodic nature of the $\cos^2$ function. However, the violet components are removed or greatly reduced by absorption at the color-selective polarizer 4, whose response is shown in FIG. 4b. The overall filter transmission is the product of this absorption times the birefringent effect and is shown by the curve in FIG. 5. The light appears as a pure red, free of violet hues.

Figure 5:
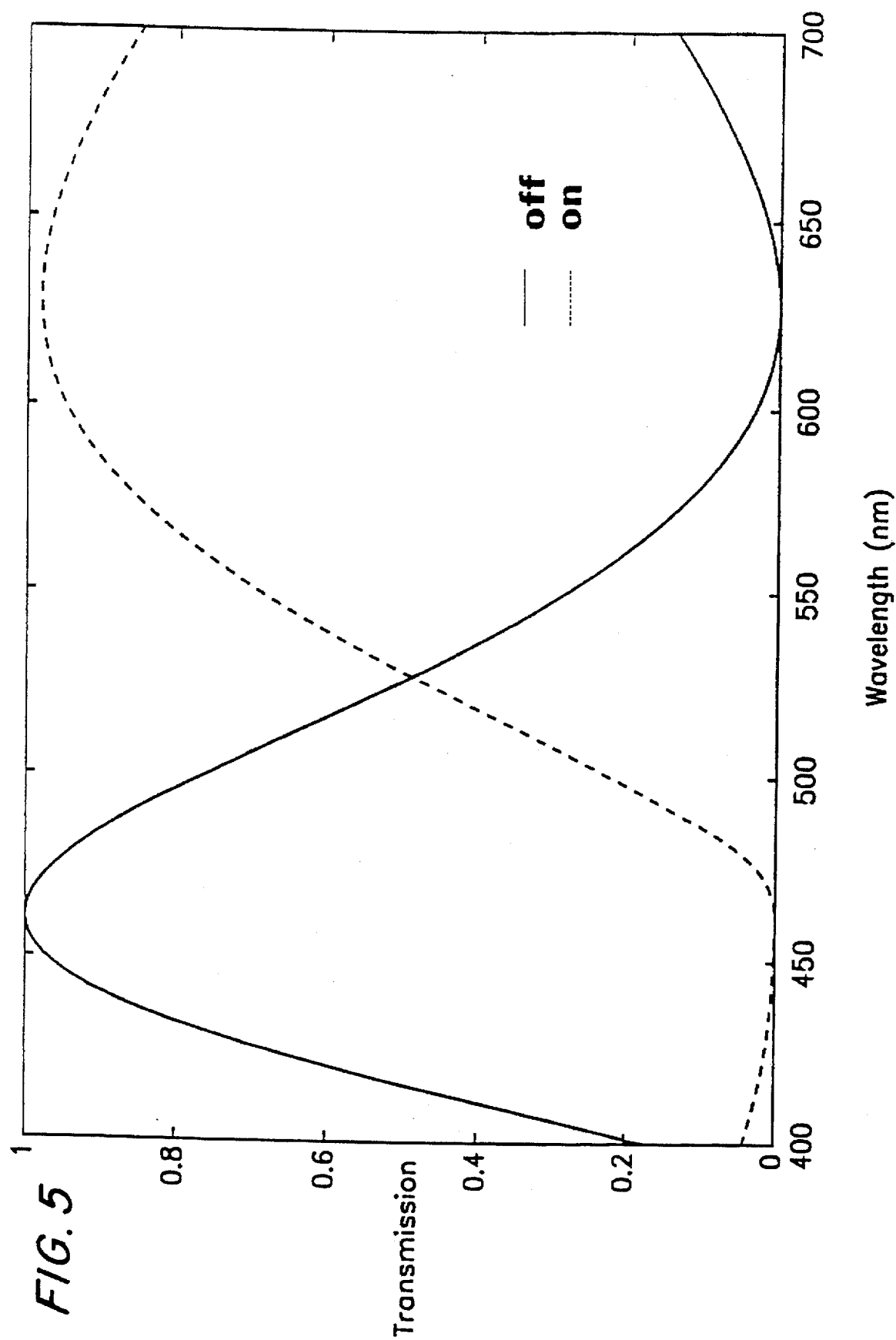
FIG. 5 shows the performance of a filter according to the present invention utilizing components having the transmission characteristics shown in FIGS. 4a and 4b, with the liquid crystal cell turned on and off.

As seen in FIG. 5, light from the unwanted sidebands in the violet have been removed from the red on-state response of filter 10 without affecting the high transmission of violet light in its blue-aqua off-state. Because of the above-described order and orientation of components of the filter of the present invention, the twisted-nematic liquid crystal element 22, or its art-recognized equivalent, at once selects between the complementary transmission functions $\sin^2$ ($\pi R/\lambda$) and $\cos^2$ ($\pi R/\lambda$), and engages or disengages a piece of color-selective polarizer 24. This polarizer does not determine precisely what wavelength experiences peak transmission; that is achieved by the polarization interference effect. The color-selective polarizer is used to squelch the unwanted sidebands or adjacent transmission peaks of the polarization interference function.

Since it is used solely to enhance the color contrast, the color-selective polarizer 24 does not need to have as high a degree of extinction as is usual in other color filter systems. An off-state leakage of 5 percent is acceptable, which means that on-state transmission can exceed 95 percent. Also, the spectral requirements are considerably relaxed, relative to those of existing color filters. Existing filters need polarizers with an absorption profile which exactly fits the desired color set. In particular, the transition from a region of high to low transmission must be monotonic and cover a wide dynamic range to be useful for most applications. In the present invention, a lesser dynamic range is required, because the polarizer is used in concert with polarization interference effects. Since the polarization interference of the birefringent retarder and the neutral polarizer produce a well-defined bandpass, it is only necessary that the color-selective polarizer have low transmission in the stop-band and high transmission in the passband. The spectral range over which this transition can occur may be approximately twice as wide as in a system which relies on a color-selective polarizer alone. Because a lesser dynamic range of transmissions is required, and there is less need for spectral selectivity, the requirements on the polarizer element are greatly relaxed, while at the same time the overall filter transmission is increased.

It should be noted that embodiments of this invention which utilize a twisted-nematic liquid crystal as the optical switch element may be constructed with the entrance axis of the liquid crystal perpendicular to the polarization of incident light, although a parallel orientation was illustrated in the previous example. Similar performance is obtained for the two orientations.

The selection of a twisted-nematic cell with 90° helical twist or one of the supertwist designs with an alternative helical twist angle such as 270° may also be made in accordance with the known switch properties of these components, and the decision of one or the other twist angle should be made based on the field-of-view, multiplexing requirements, and simplicity of manufacture.

Also, one skilled in the art will recognize that the orientation of the color-selective polarizer is chosen in order to determine whether it is more absorptive in the filter's on-state or the off-state. The color properties of the polarizer material may be chosen in any embodiment, in order to achieve a desired color response.

It is also possible to implement this invention to construct a filter using significantly higher retardance. The retardance value is chosen in order to produce a desired filter response, and variations from the above example can be incorporated together with variations in the twisted-nematic cell orientation and that of the color-selective polarizer. For example, if the 630 nm retarder 27 of the previous embodiment is replaced by a 1250 nm retarder, and the violet-absorptive polarizer 24 is rotated so that it transmits all light polarized along its vertical axis 26, while absorbing light of λ<450 along its horizontal axis 25, another illustrative application of the filter is obtained.

In the off-state for this filter, vertically-polarized light emerging from polarizer 20 is rotated into the horizontal state, where light λ<450 nm is removed. Light passing through the retarder 27 and exit polarizer 29 experiences a color dependent transmission $\sin^2(\pi R/\lambda)$, which has a maximum retarder transmission at 535 nm, with minima at 625 nm and 455 nm. Although the retarder alone has substantial transmission below 450 nm, it is squelched by the color-selective polarizer. The resultant light is a nearly pure green, free of violet contamination. In the on-state, the complementary response $\cos^2(\pi R/\lambda)$ is obtained from the retarder, which has transmission maxima at both 455 nm and 625 nm. Thus, a magenta color is produced.

Figure 6:
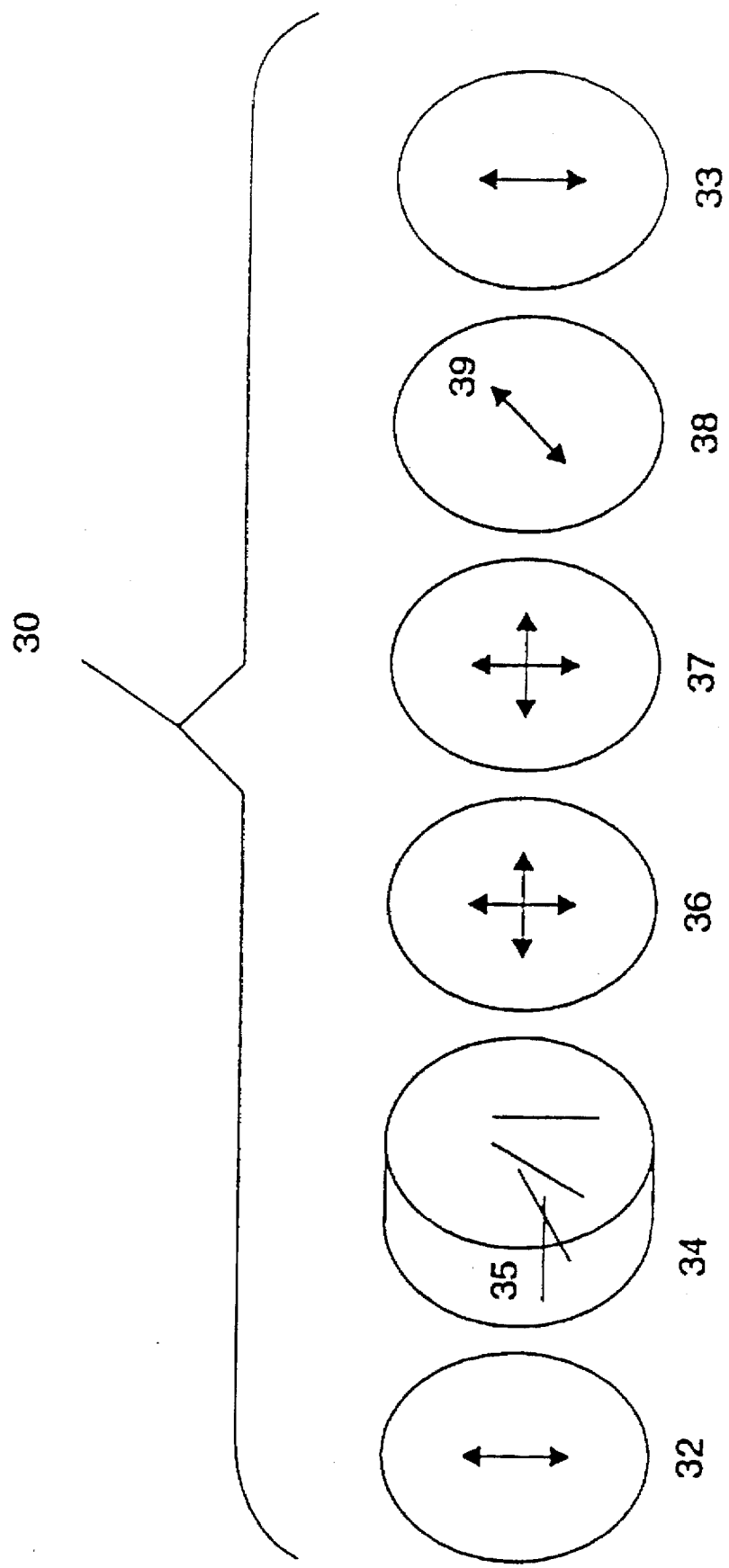
FIG. 6 shows an alternate embodiment of the inventive filter.

It will now be shown how the invention can be utilized to improve the color of two filter states, rather than one as illustrated above. This example also illustrates that the twisted nematic cell may be oriented so that its input crystal axis is orthogonal to the polarization of light, as well as parallel to it. Reference is now made to a filter 30 constructed as shown in FIG. 6. Entrance polarizer 32 and exit polarizer 33 are neutral linear polarizers, oriented to transmit vertically-polarized light. Twisted nematic liquid crystal cell 34 follows immediately after entrance polarizer 32, shown in this embodiment with its entrance crystal axis 35 oriented horizontally. Violet absorptive polarizer 36 is oriented to transmit all colors of vertically polarized light, and to absorb horizontally polarized light $\lambda<450$ nm, such as is shown in FIG. 4b. A second, red absorptive polarizer 37 is added, which transmits all colors of horizontally-polarized light, and absorbs vertically polarized light $\lambda>600$ nm, such as is shown in FIG. 7b. Birefringent retarder 38 has a retardance of 900 nm, with its crystal axis 39 at 45°.

When the filter 30 is in the off-state, i.e. with liquid crystal cell 34 off, vertically-polarized light from the entrance polarizer is rotated by the liquid crystal cell 34 and then encounters the color-selective polarizers 36 and 37 in the horizontal state. The violet absorptive polarizer 36 absorbs the violet light from the beam, while the red absorptive polarizer 37 has no effect. The resultant horizontally polarized light experiences a transmission of $\sin^2(\pi R/\lambda)$ in passing through the retarder 38 and exit polarizer 33. This function has a high transmission at 600 nm, tapering off to a minimum at 480 nm and rising again at shorter wavelengths. These wavelengths, however, were removed by the violet absorptive polarizer element 36. Overall, orange light is produced, with no violet contaminant.

Figure 7A:
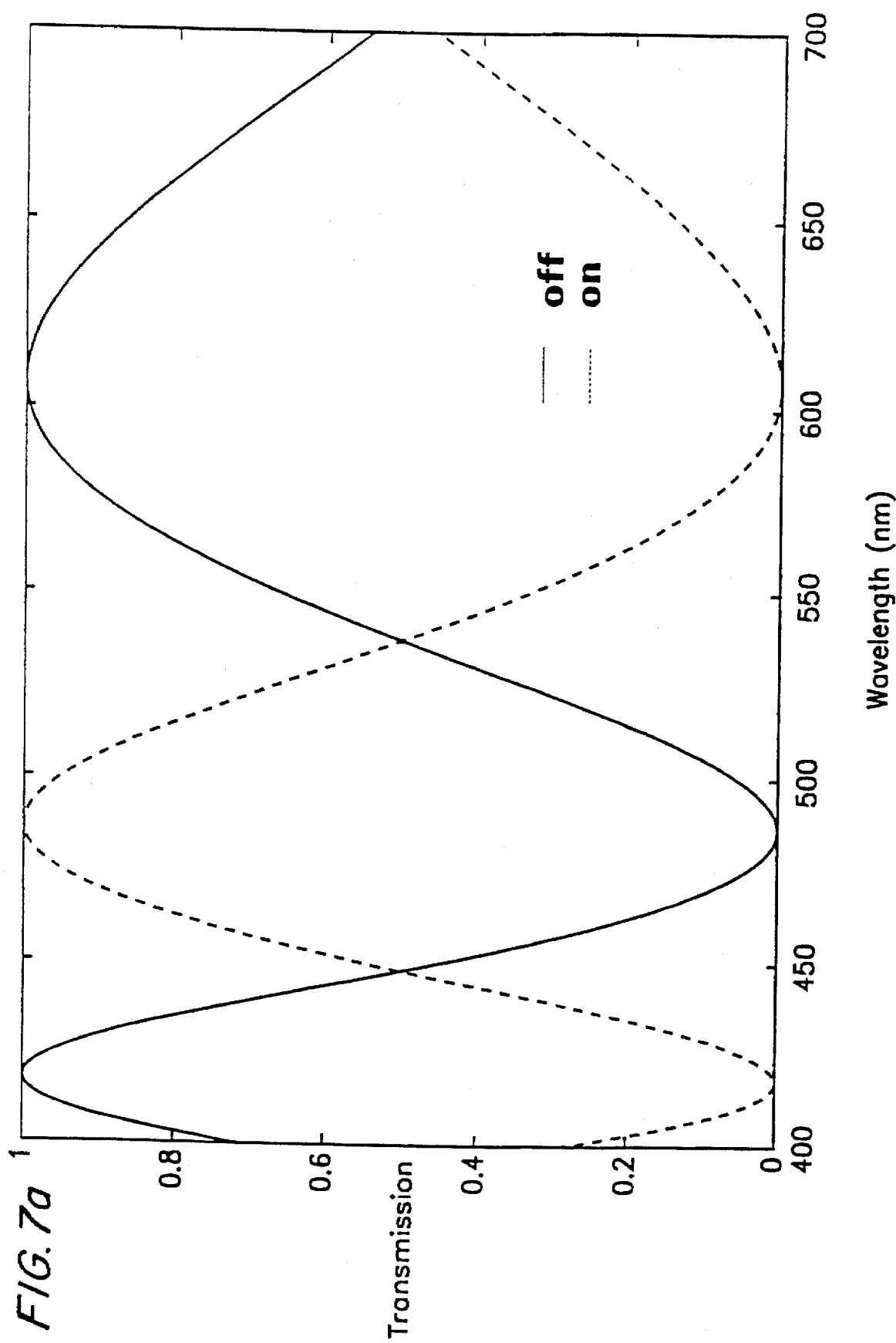
FIG. 7a shows the transmission produced by the birefringent element used in the embodiment of FIG. 6.
Figure 8:
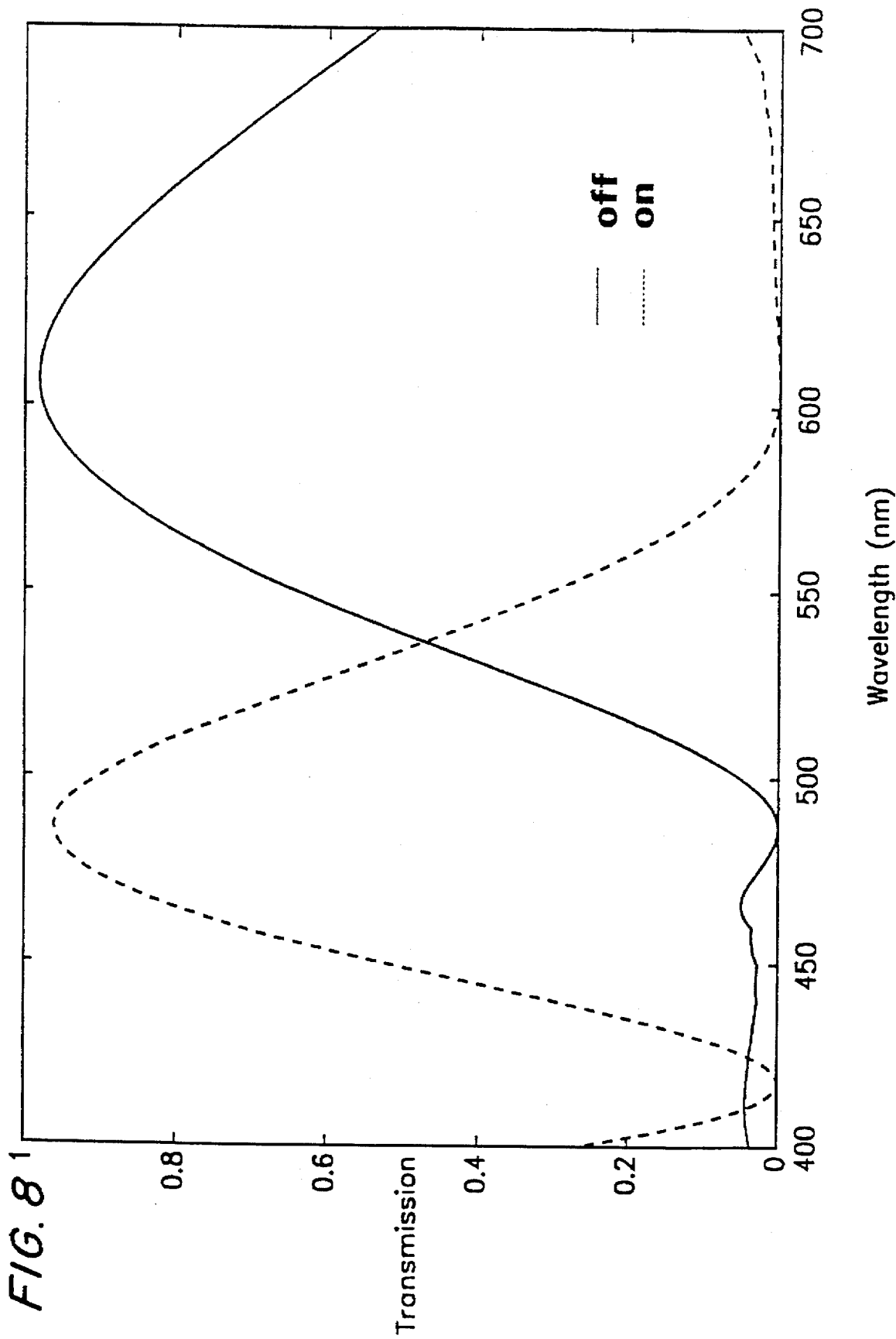
FIG. 8 shows the performance of a filter with two improved color states constructed in accordance with this invention, with the liquid crystal turned on and off.

When the filter 30 is in the on-state, i.e. with liquid crystal cell 34 on, the liquid crystal cell 34 has no effect on the light from the input polarizer, and vertically-polarized light is presented to the color selective polarizers 36 and 37. The violet absorptive polarizer 36 transmits all incident light, while the red absorptive polarizer 37 absorbs all light $\lambda>600$ nm. The light is vertically polarized when it encounters the retarder 38 and exit polarizer 33, and so experiences the complementary transmission function, $\cos^2(\pi R/\lambda)$. This has a peak at 480 nm, dropping to a minimum at 600, but rising again in the deep red, as is shown in FIG. 7a. In the overall filter response, however, these deep red spectral components are absent, having been removed by the red absorptive polarizer 37. As a result, an emerald color is generated by the filter 30.

The result is that both the emerald and the orange states have their saturation improved by the incorporation of two types of color-selective polarizers within a single filter. Unlike filters in the prior art, filters constructed according to the present invention use a single liquid crystal element to engage the polarizers and to select between complementary polarization interference functions.

Figure 9:
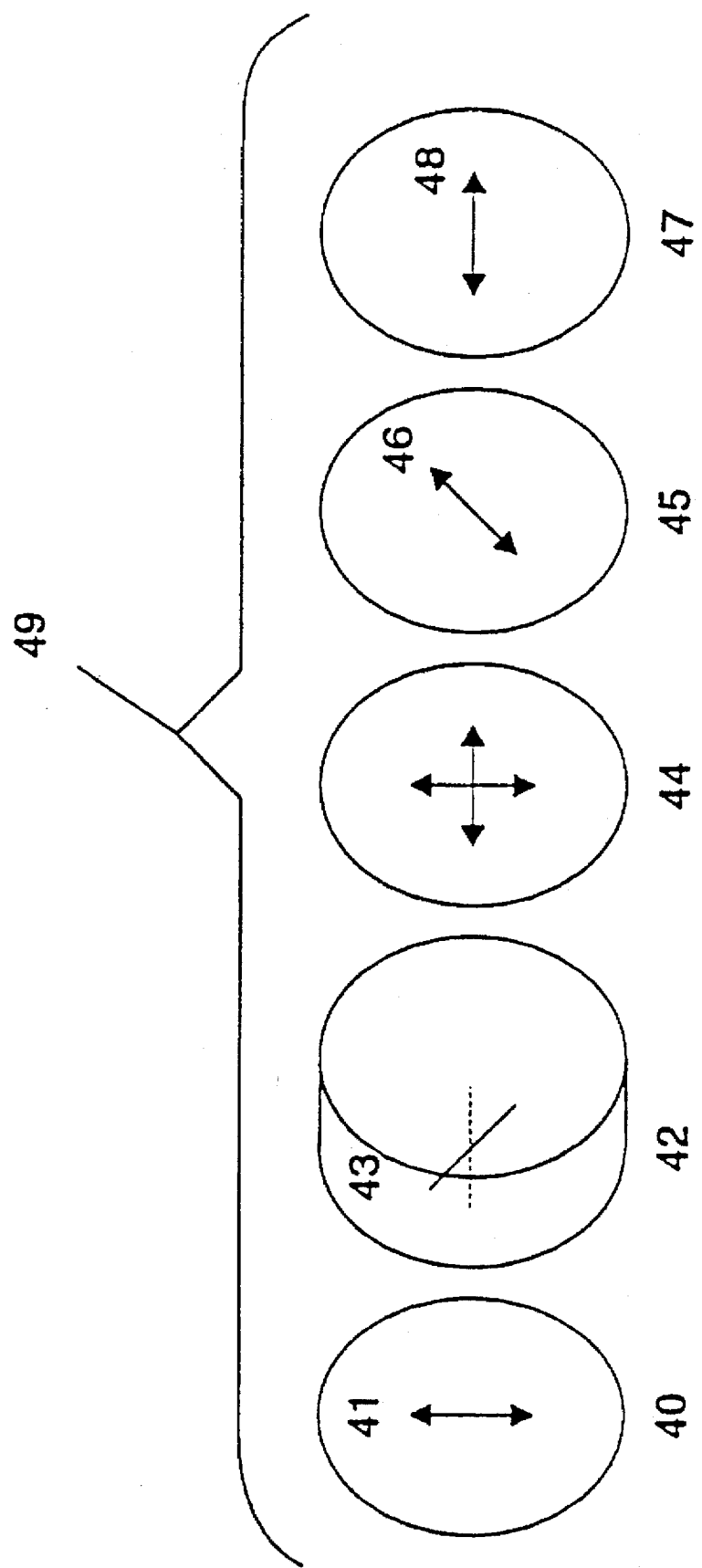
FIG. 9 shows a third embodiment of the invention, constructed using an SSFLC as the optical switch element.

In another embodiment, shown in FIG. 9, the filter 49 is based on an SSFLC retarder element 42. Filter 49 includes a linear polarizer 40 with a vertical transmission axis 41; an SSFLC 42 with a retardance of $\lambda/2$ (such as, for example, 280 nm) and a crystal axis 43 that can be switched between 0° and 45°; a color-selective polarizer 44 which, for example, absorbs horizontally polarized light $\lambda<450$ nm, and absorbs vertically polarized light of $\lambda>600$ nm; a fixed retarder 45, of 610 nm retardance for example, with its crystal axis 46 at 45°; and a second linear polarizer 47 with its transmission axis 48 oriented horizontally. When the SSFLC crystal axis 43 is at 0°, incident vertically-polarized light passes unchanged through SSFLC element 42 and continues to color-selective polarizer 44 where light $\lambda>600$ nm is absorbed. Still vertically-polarized, it encounters the retarder 45 and undergoes polarization-selective delay, which is analyzed at the exit polarizer 47. According to the transmission equation $T=\sin^2(\pi R/\lambda)$, the transmission is high for $\lambda \approx 450$ nm, falling at longer wavelengths until a minimum is reached at 610 nm. Above this wavelength, the transmission increases, but these components are absorbed at element 44. Thus a pure blue is produced by filter 49 with no red leakage.

When the SSFLC 42 is switched to the 45° state, it acts as a half-wave plate and rotates the plane of polarization by 90°. In this state, horizontally-polarized light encounters the color-selective polarizer 44, where light $\lambda<450$ nm is absorbed. It then passes through the retarder 45 and is analyzed at the exit polarizer 47, but this time the $\sin^2(\pi(R+280\text{ nm})/\lambda)$ response is obtained. High transmission occurs at 600 nm, dropping off until a minimum at 470 nm, and then rising in the violet. The output light of filter 49 is a pure red, free of violet tints, as these were removed at the color-selective polarizer element 44. This example illustrates how the SSFLC acts as a variable retarder to tune the birefringent action of the filter, at the same time as it engages or disengages the color-selective polarizer. It is clear that the SSFLC must have a retardance substantially equal to $\lambda/2$ to achieve these dual functions. Of course it will be recognized that the transmission wavelengths described for this embodiment are merely illustrative, and may vary within the available operating ranges of the individual components selected in accordance with the requirements to which the filter is applied.

Thus it can be seen in this embodiment how the SSFLC can be used as the switch element to construct a filter in accordance with the invention. The SSFLC acts as a retarder with a retardance of $\lambda/2$ whose crystal axis is switched between two orientations. Similarly, an electroclinic tunable liquid crystal cell can also be used to perform this function, since it exhibits an essentially fixed retardance with a crystal axis that can be re-oriented under electrical drive. Presently available electroclinic cells have a somewhat limited re-orientation range (a few degrees or less), but new liquid crystal materials are on the horizon which will broaden the available re-orientation range, making electroclinics a viable alternative for use in the present invention.

Figure 10:
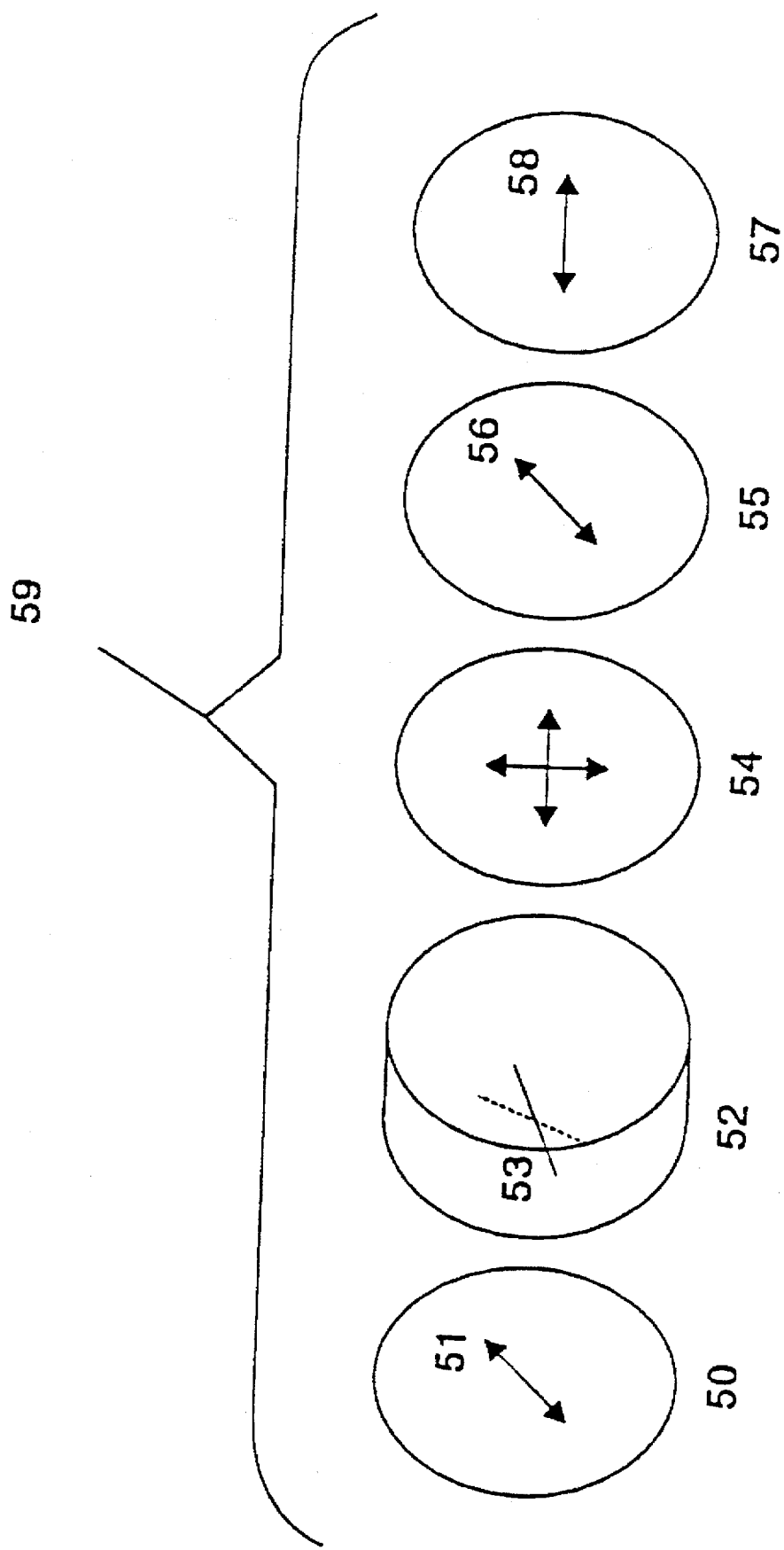
FIG. 10 shows an alternative implementation of the SSFLC filter.

FIG. 10 illustrates still another alternative construction for an SSFLC filter identified as 59. The filter 59 is similar to the previous filter 49, except that the orientation of the input polarizer and SSFLC have been chosen differently. This embodiment, as seen in FIG. 10, comprises an input polarizer 50 with its polarization axis 51 at 45°; followed by an SSFLC cell 52 with a retardance of $\lambda/2$ (such as, for example, 270 nm), and a crystal axis 53 which can be selected between 22.5° and 67.5°; a color-selective polarizer 54 which, for purposes of example, absorbs vertically-polarized light with $\lambda>600$ nm, and absorbs horizontally-polarized light $\lambda<450$ nm; a retarder element 55 with, for example, 610 nm of retardance and a crystal axis 56 oriented at 45°; and a neutral linear polarizer 57 oriented to transmit horizontally-polarized light. Those skilled in this art will recognize that the behavior of filter 59 is nearly identical to the previously described filter 49. When the SSFLC axis 53 is oriented at 67.5°, it transforms the polarization from an orientation of 45° to vertical. The light then proceeds through the rest of the elements and, in analogous fashion to the previous example, emerges as a pure blue color. Conversely, when the SSFLC axis 53 is oriented at 22.5°, it transforms the light from its initial 45° orientation to a horizontal polarization. The light then passes through the color-selective polarizer 54, retarder 55, and exit polarizer 57, as in the above example, and once again a pure red color is produced.

A person familiar with the polarization of light and the properties of the above-described filter components will recognize that the purpose of the first two elements in filters 49 and 59 is to produce light which is vertical or horizontal in its polarization, which polarization may be switched by operation of the SSFLC. There is a subtle difference arising from the chromatic quality of the SSFLC, which does not exhibit exactly $\lambda/2$ retardance for all wavelengths of light. As a result, the switch action is imperfect, leading to some mixing of the two color states, and a reduction in the color saturation. A twisted-nematic cell can be considerably more achromatic in its response, and may be preferable when maximum color saturation is required. However, the SSFLC illustrated here has much faster switching action (100 µs vs. 10 ms), and it may be preferred for certain applications in spite of its lower color saturation.

Figure 11:
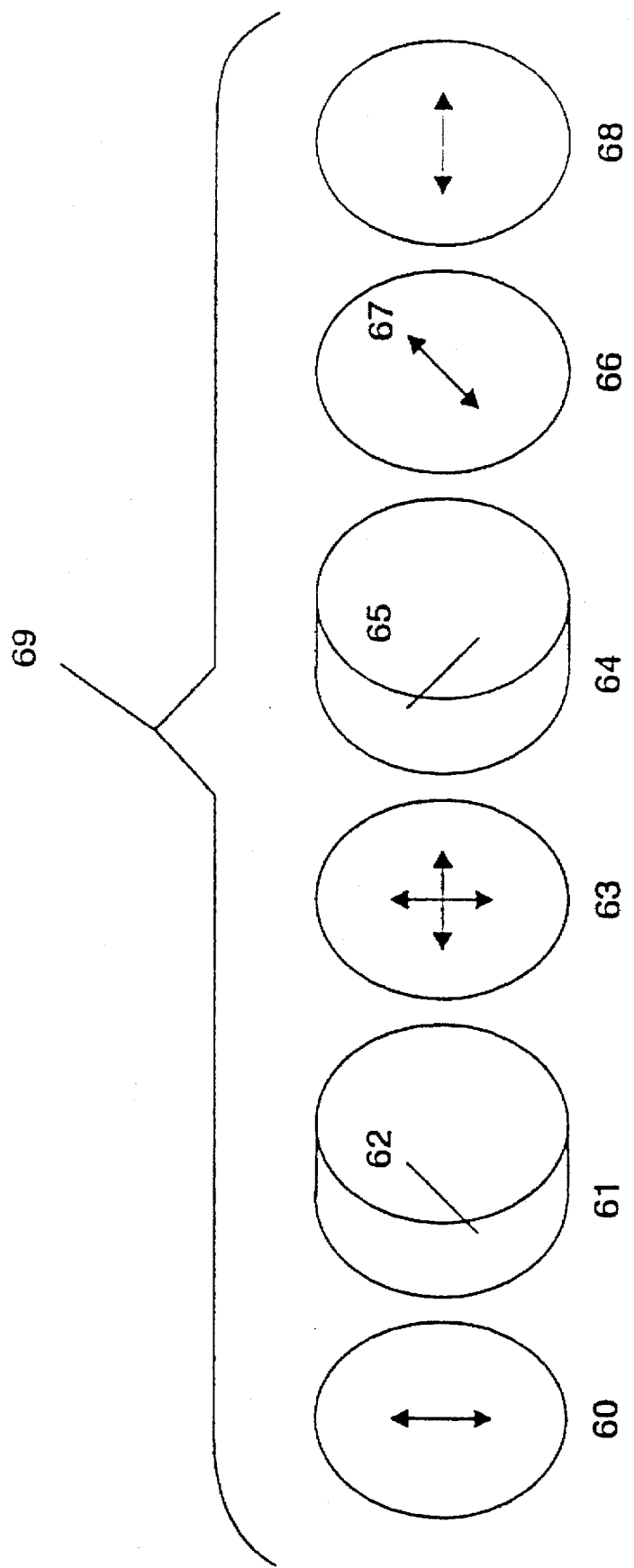
FIG. 11 shows a three-color embodiment of the inventive filter constructed using two filter stages in series, using nematic variable retarders as optical switch elements.

Filters using this invention can also be constructed using variable-retardance nematic cells, as shown in FIG. 11. Filter 69 could be constructed using SSFLC elements, but for purposes of illustration it is made with nematic cells. It includes a neutral polarizer 60 oriented vertically, a variable-retardance nematic cell 61 of $\lambda/2$ retardance with its crystal axis 62 oriented at 45°, a piece of color-selective polarizer 63 which transmits horizontally-polarized light $\lambda>500$ nm and vertically-polarized light $\lambda<580$ nm, a variable-retardance cell 64 of $\lambda/5$ with its crystal axis 65 oriented at −45°, a fixed retarder 66 of 600 nm retardance and a crystal axis 67 at 45°, and a neutral linear polarizer 68 oriented to transmit horizontally-polarized light. Its operation can be compactly summarized using a table:

| Nematic retarder 61 state | Polarization state at 63 | Polarizer 63 transmits colors | Nematic retarder 64 state | Retardance interference transmission peak | Overall color |
| --- | --- | --- | --- | --- | --- |
| $\lambda/2$ (off) | horizontal | >500 nm | $\lambda/5$ (off) | 550 nm | green |
| $\lambda/2$ (off) | horizontal | >500 nm | 0 (on) | 600 nm | red |
| 0 (on) | vertical | <580 nm | 0 (on) | 450 nm | blue |

It will thus be seen that filter 69 is a three-color filter, with high saturation. A feature of this filter is that the peak wavelengths may be selected by choice of fixed retarder 66 and the $\lambda/5$ variable retarder 64. The former element determines the blue-state polarization interference pattern, while the latter element sets the difference in spacing between the green and red states. As a result, the wavelength of the green state may be freely chosen, and is readily centered at 550 nm, the CIE peak. The red-blue separation is set, for a given fixed retarder, by the requirement that liquid crystal cell 61 be a $\lambda/2$ waveplate. Good filter colors do not depend on the detailed performance of polarizer 63: that component need only exhibit moderate absorption at wavelengths well removed from the passband for which it is a contrast element.

Filter 69 may be constructed using an SSFLC element in place of the $\lambda/2$ variable retarder 61; the result will be equivalent. A twisted nematic element may be successfully substituted for retarder 61 as well. Similarly, an SSFLC element could be used in place of $\lambda/5$ variable retarder element 64. The choice of one component over another may be made on the basis of tuning speed, ease of fabrication, and other art-recognized design considerations.

Figure 12:
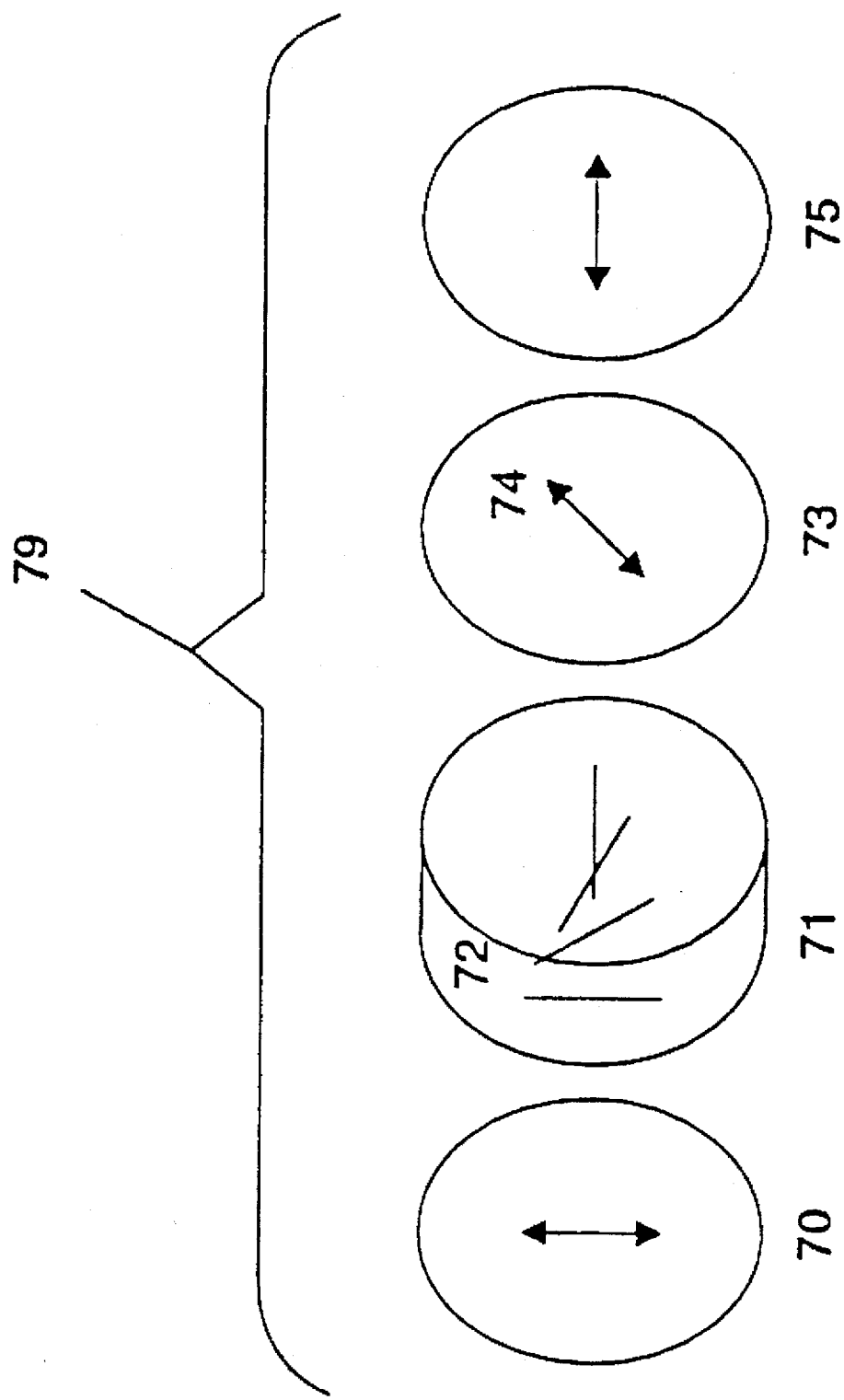
FIG. 12 shows an additional embodiment of the inventive filter which uses a twisted-nematic guest-host cell as the optical switch element.

The next embodiment illustrates how this invention can be constructed using guest-host cells as the switch element. The device 79 depicted in FIG. 12 shows a neutral linear polarizer 70, oriented to transmit vertically-polarized light; a twisted-nematic cell 71 doped with a color-selective guest dye that absorbs violet light polarized along the director axis 72, which is vertical at the input face and horizontal at the exit face; a fixed retarder 73 of, for example, 610 nm retardance, with its crystal axis 74 oriented at 45°; and a second linear polarizer 75 oriented horizontally. All these elements are placed so light passes through them in series.

Input light is vertically polarized by polarizer 70. When the liquid crystal cell 71 of filter 79 is undriven, light passing through it has the violet component removed and at the same time its polarization is rotated to be horizontal. It then encounters fixed retarder 73, whose retardance causes a polarization interference pattern to be expressed at exit polarizer 75, of the form $\cos_2(\pi R/\lambda)$. This has a maximum at 610 nm and a minimum at 480 nm, so an orange color is produced, with no violet light.

In the driven state, the cell 71 of filter 79 does not rotate the polarization of light, and absorbs only a small fraction of the blue light. At retarder 73 and exit polarizer 75, a polarization interference pattern is produced with the complementary function $\sin^2(\pi R/\lambda)$, which has a maximum at 480 nm and a minimum at 610 nm. Aqua light is produced, with only slight loss of violet light.

It is worth comparing the guest-host filter against filters utilizing color-selective polarizers. The latter require an additional element relative to the former, namely the color-selective polarizer. This is because the switching and selective-absorption functions are incorporated in a single part when a guest-host element is used. However, the contrast of such an element, expressed as the ratio of optical density for the orthogonal polarization states, is generally inferior to that of a color-selective polarizer. This is because of the lesser degree of order in a guest-host liquid crystal cell ($S \approx 0.75$) compared to that of a polarizer ($S > 0.97$). To the degree that each element is disordered (1−S), light is treated as if it were of the orthogonal polarization state, and so the contrast is reduced.

The embodiments and examples described above illustrate a range of filter designs which can be achieved using this invention, and in general the preferred embodiment for a particular application depends on the desired color set which the filter is to produce. Indeed, one of the strengths of this invention is that various color sets may be produced by suitable choice of the fixed retarder. It can be implemented in a wide range of liquid crystal technologies, with the preferred technology being chosen for reasons of speed, cost, color saturation, and other application driven design requirements.

Neutral linear polarizers may be obtained from a variety of sources, and materials such as Polaroid HN42

(Cambridge, Mass.) may be used successfully in the visible range, as can HS-38S. For infra-red filters, the material HR offers good performance. Infrared filters can use visible polarizers such as HN-38 as a color-selective polarizer to absorb short-wavelength infrared (λ<780 nm) but transmit light of longer wavelengths.

Color-selective polarizers for visible filters are available from Polaroid, type VR, as well as from International Polarizer Corp (Marlborough, Mass.). Polarizers may be constructed by dying oriented polyvinyl alcohol (PVA) with suitable dye material. Dyes for violet absorption include Sudan-I and a dye manufactured by Roche (Basel, Switzerland) and sold under the name Y-2. For selective red absorption, Roche offers a dye known as Blue-I. There are literally hundreds of appropriate dyes from various suppliers, well known in the art and drawn from the class of dichroic dyes.

Twisted nematic liquid crystal cells are constructed using the standard materials and techniques developed for well known display elements. These include two substrates of borosilicate glass such as Corning 7059, with a transparent electrode material such as indium-tin oxide (ITO), applied to the inner faces by magnetron sputtering deposition techniques. Coated glass is available commercially from Balzers (Fremont, Calif.). An alignment layer is applied to each substrate to align the liquid crystal director, as is widely known in the art and described, for example, in *Alignment of Liquid Crystals and Their Mixtures*, by J. Cognard. Alignment by spin-coating with polyimide and buffing yields good performance. The liquid crystal material may be selected from the mixtures available from Merck and sold by E.M. Industries (Hawthorne, N.Y.); one example is ZLI-1565. The cell may be of the 'second-minimum' type, where the product of the birefringence on and thickness d, is chosen to be 1.9λ. This design offers high contrast and wide viewing angle, and manufacture of liquid crystal cells with selected thickness in this range is widespread in the display industry. However, cells having other thicknesses can also work well in the filter of the present invention. If thickness is not well-controlled, it is better to use thicker cells (d≈15μ) to insure high contrast. Cells are available from UCI (Norwalk, Conn.), as well as many other vendors.

When variable-retardance nematic liquid crystal cells are used to implement the filter, the same materials and suppliers are appropriate as for twisted nematic cells. The thickness and birefringence are selected to achieve a desired retardance, rather than to meet the criteria of 1.9λ. Control of the thickness to better than 1μ across the aperture is preferred, in order to achieve good uniformity of colors. Cells of this type are made by Crystaloid (Hudson, Ohio).

Guest-host nematic liquid crystal cells may be constructed using the methods described for twisted-nematic cells, but using a small dopant of the desired dye material mixed with the liquid crystal. The dyes listed earlier are suitable for this purpose, as are many others known in the art. The dye concentration and cell thickness must be adjusted to produce the desired absorption. Commercial guest-host cells are also available from Crystaloid.

Ferroelectric cells may be manufactured using the same materials, with spacing d chosen to achieve the required retardance (generally d<5μ). The same substrate and electrode materials are suitable, and successful alignment may be achieved using buffed polymer layers as described in "A reliable method of alignment for smectic liquid crystals" by J. S. Patel, T. M. Leslie, and J. W. Goodby, published in Ferroelectrics 59, 137, (1984). Chisso supplies ferroelectric liquid crystal material through its U.S. agent, Uniglobe (Kisco, N.Y.). Mixtures with an inclination angle of 22.5° are desired, such as CS-1014. Complete cells may be purchased from Displaytek or from Boulder Nonlinear (both of Boulder, Colo.).

Fixed retarder material is frequently constructed using oriented polyvinyl alcohol (PVA), but other materials may be used, including crystal quartz, mica, calcite, $LiNbO_3$, polymethyl methacrylate, polycarbonate, polyethylene terapthylate, polypropylene, polytetrafluoroethylene (PTFE), and others. The polymer materials are appropriate when a small amount of retardance is required (R<1500 nm), since they offer good performance and low price. These are widely used in the display industry, and may be purchased from International Polarizer or Polaroid. Quartz retarders are available from Inrad (Northvale, N.J.), along with a variety of crystalline retarders. Choice of a suitable material depends on the spectral range and the filter requirements, which determine the retardance R by the function $\cos^2(\pi R/\lambda)$ and its complement, $\sin^2(\pi R/\lambda)$.

Those skilled in the art will recognize that the various embodiments and examples of the invention set forth herein do not contain all possible realizations. The choice of materials, particularly the color-selective polarizer dyes and fixed retarders, may be made to achieve a widely variable desired set of transmitted colors, with optimal blocking of unwanted colors. Since the colors vary with the intended use, the materials used in a particular design will depend on the application, and the examples given above are illustrative but not necessarily exhaustive.

The invention is of course not limited to the visible spectrum, and filters operating in the infrared or ultraviolet may be constructed using elements such as those described above and/or their equivalents, or other similar materials more suitable to those spectral ranges. For example, Polaroid HN42 is effectively a color-selective polarizer which polarizes light λ<750 nm, and transmits light of both polarizations for λ>750. It can be used with near-infrared optical switches, polarizers and retarders to make infra-red false-color switchable filters with improved saturation. Polaroid HR is a suitable neutral polarizer for this purpose.

The order of elements within a filter may be reversed, and the orientation of the polarizers to the vertical or horizontal sense will vary from design to design. Also, numerous orientations of the liquid crystal elements may be used successfully, as was illustrated in the examples. The use of a second liquid crystal element within a filter to produce a threecolor filter with high color saturation is possible for all embodiments of the invention. Such an element may be placed on either side of the fixed retarder element.

Variations of this sort will be apparent to those skilled in the art, and therefore the scope of the invention should be construed with reference to the following claims.

What is claimed is:

1. A tunable filter system for filtering light, comprising in optical alignment:
   (a) a first neutral linear polarizer;
   (b) an optical switch;
   (c) a color-selective polarizer;
   (d) an optical retarder; and
   (e) a second neutral linear polarizer, said elements being arranged in a series order selected from a group of orders consisting of (a) through (e) and (e) through (a).

2. A tunable filter system in accordance with claim 1, wherein said optical switch is a liquid crystal cell.

3. A tunable filter system in accordance with claim 2, wherein said liquid crystal cell is a nematic variable retarder type cell.

4. A tunable filter system in accordance with claim 3, wherein said light being filtered has a wavelength of λ and wherein said liquid crystal cell exhibits a retardance selected from a group of retardances consisting of substantially 0 and λ/2 for said light being filtered.

5. A tunable filter system in accordance with claim 1, wherein said first neutral linear polarizer has a first linear polarizer axis, and wherein said optical switch has at least one selectable crystal axis orientation substantially 45° to said first linear polarizer axis.

6. A tunable filter system in accordance with claim 1, wherein said first neutral linear polarizer has a first linear polarizer axis, and wherein said optical switch has at least one selectable crystal axis orientation substantially parallel to said first linear polarizer axis.

7. A tunable filter system in accordance with claim 1, wherein said first neutral linear polarizer has a first linear polarizer axis, and wherein said optical switch has at least one selectable crystal axis orientation substantially perpendicular to said first linear polarizer axis.

8. A tunable filter system in accordance with claim 1, wherein said first neutral linear polarizer has a first linear polarizer axis, and wherein said optical switch is switchable among a plurality of selectable crystal axis orientations selected from a group of orientations consisting of substantially 45° to said first linear polar axis, substantially parallel to said first linear polarizer axis and substantially perpendicular to said first linear polarizer axis.

9. A tunable filter system in accordance with claim 1, wherein said first neutral linear polarizer has a first polarizer axis, and wherein said optical switch has a first crystal axis orientation which is substantially 22½° to said first polarizer axis and a second crystal axis orientation which is substantially 67½° to said first polarizer axis.

10. A tunable filter system in accordance with claim 1, wherein said first neutral linear polarizer has a first polarizer axis, and wherein said optical switch has a first orientation which is substantially 22½° to said first crystal axis polarizer axis in a first rotational sense and a second crystal axis orientation which is substantially 22½° to said first polarizer axis in a second rotational sense.

11. A tunable filter system in accordance with claim 1, wherein said optical switch is a surface stabilized ferroelectric liquid crystal (SSFLC) type cell.

12. A tunable filter system in accordance with claim 11, wherein said light being filtered has a range of wavelengths centered about a wavelength of λ and wherein said SSFLC cell has a retardance of substantially λ/2.

13. A tunable filter system in accordance with claim 1, wherein said color-selective polarizer exhibits high transmission for wavelengths of light having a first polarization state, and wherein said color-selective polarizer absorbs light of preselected wavelengths having a second polarization state.

14. A tunable filter system in accordance with claim 13, wherein said second polarization state is orthogonal to said first polarization state.

15. A tunable filter system in accordance with claim 1, wherein said color-selective polarizer absorbs a preselected range of wavelengths of light having a first polarization state, and wherein said color-selective polarizer absorbs a different preselected range of wavelengths of light having a second polarization state.

16. A tunable filter system in accordance with claim 15, wherein said second polarization state is orthogonal to said first polarization state.

17. A tunable filter system in accordance with claim 1, wherein said filter system has an overall retardance value and further comprises a second optical switch positioned adjacent said optical retarder element for varying said overall retardance value.

18. A tunable filter system in accordance with claim 17, wherein said second optical switch is a liquid crystal cell.

19. A tunable filter system in accordance with claim 18, wherein said optical retarder element has a retarder crystal axis and wherein said liquid crystal cell is a nematic variable retarder type cell having a liquid crystal cell axis orientation selected from a group of orientations consisting of substantially parallel to said retarder crystal axis and substantially perpendicular to said retarder crystal axis.

20. A tunable filter system in accordance with claim 18, wherein said optical retarder element has a retarder crystal axis and wherein said liquid crystal cell is a surface-stabilized ferroelectric liquid crystal (SSFLC) type cell having a first selectable SSFLC axis orientation at substantially 45° to said fixed retarder crystal axis and a second selectable SSFLC axis orientation selected from a group of orientations consisting of substantially parallel to said fixed retarder crystal axis and substantially perpendicular to said fixed retarder crystal axis.

21. A tunable filter system in accordance with claim 1, wherein said optical switch is selected from a group consisting of a twisted nematic liquid crystal cell and a supertwist twisted nematic liquid crystal cell.

22. A tunable filter system in accordance with claim 1, wherein said light to be filtered has a spectrum, and wherein said spectrum is selected from a group consisting of visible light, near-infrared light, infrared light and ultraviolet light.

23. A tunable filter system in accordance with claim 1, wherein said optical retarder has a crystal axis oriented at substantially 45 degrees relative to said first neutral linear polarizer.

24. A tunable filter system for filtering light, comprising in optical alignment:

(a) a first neutral linear polarizer;

(b) an optical switch containing a color selective dye for selectively passing a preselected wavelength of light;

(c) an optical retarder element having a crystal axis oriented at substantially 45 degrees relative to said first neutral linear polarizer; and (d) a second neutral linear polarizer, said elements being arranged in a series order selected from a group of orders consisting of (a) through (d) and (d) through.

25. A tunable filter in accordance with claim 24, wherein said optical switch is a first liquid crystal cell.

26. A tunable filter in accordance with claim 24, wherein said optical switch is a first liquid crystal cell selected from a group consisting of a twisted nematic guest host liquid crystal cell and a supertwist twisted nematic guest host liquid crystal cell.

27. A tunable filter system in accordance with claim 26, wherein said first liquid crystal cell is a twisted nematic guest host liquid crystal cell and said second optical switch is a second liquid crystal cell.

28. A tunable filter system in accordance with claim 27, wherein said optical retarder element has a retarder crystal axis and wherein said second liquid crystal cell is a nematic variable retarder type cell having a liquid crystal cell axis orientation selected from a group of orientations consisting of Substantially parallel to said retarder crystal axis and substantially perpendicular to said retarder crystal axis.

29. A tunable filter system in accordance with claim 27, wherein said optical retarder element has a retarder crystal axis and wherein said second liquid crystal cell is a surface-stabilized ferroelectric liquid crystal (SSFLC) type cell having a first selectable SSFLC axis orientation at substantially 45° to said fixed retarder crystal axis and a second selectable SSFLC axis orientation selected from a group of orientations consisting of substantially parallel to said fixed retarder crystal axis and substantially perpendicular to said fixed retarder crystal axis.

30. A tunable filter system in accordance with claim 24, wherein said filter system has an overall retardance value and further comprises a second optical switch positioned adjacent said optical retarder element for varying said overall retardance value.

31. A tunable filter system in accordance with claim 24, wherein said light to be filtered has a spectrum, and wherein said spectrum is selected from a group consisting of visible light, near-infrared light, infrared light and ultraviolet light.

32. A tunable color filter system for filtering light, comprising in optical alignment:

(a) a first neutral linear polarizer having a preselected polarization axis;

(b) an optical switch capable of selectably transmitting light in a first substantially linear polarization state and a second substantially linear polarization state, said second polarization state being substantially orthogonal to said first polarization state;

(c) a color-selective polarizer having an axis substantially parallel to a polarization state selected from a group consisting of said first polarization state and said second polarization state;

(d) an optical retarder having a retarder crystal axis substantially at an angle selected from a first group of angles consisting of substantially 45° greater than said first polarization state and substantially 45° less than said first polarization state; and (e) a second neutral linear polarizer having a polarization axis substantially at an angle selected from a second group of angles consisting of substantially parallel to said first polarization state and substantially parallel to said second polarization state, said elements being arranged in a series order selected from a group of orders consisting of (a) through (e) and (e) through (a).

33. A tunable filter system in accordance with claim 32, wherein said optical switch is a twisted nematic liquid crystal cell.

34. A tunable filter system in accordance with claim 32, wherein said optical switch is a surface stabilized ferroelectric liquid crystal (SSFLC) type cell.

35. A tunable filter system in accordance with claim 34, wherein said light being filtered has a wavelength of λ and wherein the SSFLC cell retardance is substantially λ/2 for the light being filtered.

36. A tunable filter system in accordance with claim 32, wherein said optical switch is a liquid crystal cell.

37. A tunable filter system in accordance with claim 36, wherein said first neutral linear polarizer has a first linear polarizer axis, and wherein said liquid crystal cell has a crystal axis orientation switchable among a plurality of selectable crystal axis orientations, at least one of said plurality of selectable crystal axis orientations having an orientation selected from a group of orientations consisting of substantially 45° to said first linear polarizer axis, substantially parallel to said first linear polarizer axis and substantially perpendicular to said first linear polarizer axis.

38. A tunable filter system in accordance with claim 36, wherein said first neutral linear polarizer has a first polarizer axis, and wherein said liquid crystal cell has a crystal axis having a first orientation which is substantially 22½° to said first polarizer axis and a second orientation which is substantially 67½° to said first polarizer axis.

39. A tunable filter system in accordance with claim 36, wherein said first neutral linear polarizer has a first polarizer axis, and wherein said liquid crystal cell has a crystal axis having a first orientation which is substantially 22½° to said first polarizer axis in a first rotational sense and a second orientation which is substantially 22½° to said first polarizer axis in a second rotational sense.

40. A tunable filter system in accordance with claim 36, wherein said filter system has an overall retardance value and further comprises a second liquid crystal cell positioned adjacent said optical retarder element for varying said overall retardance value.

41. A tunable filter system in accordance with claim 40, wherein said second liquid crystal cell is a variable-retardance nematic type cell having a liquid crystal cell axis orientation selected from a group of orientations consisting of substantially parallel to said retarder crystal axis and substantially perpendicular to said retarder crystal axis.

42. A tunable filter system in accordance with claim 40, wherein said second liquid crystal cell is a surface-stabilized ferroelectric liquid crystal (SSFLC) type cell having a first selectable SSFLC axis orientation at substantially 45° to said retarder crystal axis and a second selectable SSFLC axis orientation selected from a group of orientations consisting of substantially parallel to said retarder crystal axis and substantially perpendicular to said retarder crystal axis.

43. A tunable filter system in accordance with claim 32, wherein said optical switch is a supertwist twisted nematic liquid crystal cell.

44. A tunable filter system in accordance with claim 32, where the liquid crystal cell is a nematic variable retarder type cell.

45. A tunable filter system in accordance with claim 44, wherein said light being filtered has a wavelength of λ and wherein said nematic variable retarder type cell exhibits retardances of substantially 0 and λ/2 for the light being filtered.

46. A tunable filter system in accordance with claim 32, wherein said color-selective polarizer exhibits high transmission for wavelengths of light having a first polarization state, and wherein said color-selective polarizer absorbs light of preselected wavelengths having a second polarization state which is orthogonal to said first polarization state.

47. A tunable filter system in accordance with claim 32, wherein said light to be filtered has a spectrum, and wherein said spectrum is selected from a group of spectrums consisting of visible light, near-infrared light, infrared light and ultraviolet light.

48. A tunable filter system in accordance with claim 32, wherein said color-selective polarizer absorbs a preselected range of wavelengths of light having a first polarization state, and wherein said color-selective polarizer absorbs a different preselected range of wavelengths of light having a second polarization state which is orthogonal to said first polarization state.

49. A tunable filter system for filtering light, comprising in optical alignment:

(a) a first neutral linear polarizer having a first preselected polarization axis;

(b) a twisted nematic guest host liquid crystal cell containing a color-selective dye and having a liquid crystal axis substantially parallel to said first preselected polarization axis;

(c) an optical retarder having a retarder crystal axis substantially 45° to said first preselected polarization axis; and (d) a second neutral linear polarizer having a second preselected polarization axis, said second preselected polarization axis having an orientation selected from a group consisting of substantially parallel to said first preselected polarization axis and substantially perpendicular to said first preselected polarization axis, said elements being arranged in a series order selected from a group of orders consisting of (a) through (d) and (d) through (a).

50. A tunable filter system in accordance with claim 49, wherein said filter system has an overall retardance value and further comprises a second liquid crystal cell positioned adjacent said fixed retarder for varying said overall retardance value.

51. A tunable filter system in accordance with claim 50, wherein said second liquid crystal cell is a surface-stabilized ferroelectric liquid crystal (SSFLC) cell having an SSFLC crystal axis, said SSFLC crystal axis having an orientation selected from a group consisting of substantially 45° to said fixed retarder crystal axis, substantially parallel to said fixed retarder crystal axis and substantially perpendicular to or said fixed retarder crystal axis.

52. A tunable filter system in accordance with claim 50, wherein said light to be filtered has a spectrum, and wherein said spectrum is selected from a group of spectrums consisting of visible light, near-infrared light, infrared light and ultraviolet light.

53. A tunable filter system in accordance with claim 50, wherein said second liquid crystal cell is a nematic variable retarder type cell having a second liquid crystal axis, said second liquid crystal axis having an orientation selected from a group consisting of substantially parallel to said retarder crystal axis and substantially perpendicular to said retarder crystal axis.

54. A tunable filter system in accordance with claim 49, wherein said twisted nematic guest host liquid crystal cell is a supertwist twisted nematic guest host liquid crystal cell.

\* \* \* \* \*